(12) United States Patent
Chen et al.

(10) Patent No.: US 12,318,791 B2
(45) Date of Patent: Jun. 3, 2025

(54) JETTING VALVE WITH TWO STAGE CALIBRATING STRUCTURES

(71) Applicant: KULICKE AND SOFFA HI-TECH CO., LTD., New Taipei (TW)

(72) Inventors: Lu-Min Chen, Taipei (TW); Tsung-Lin Tsai, Taipei (TW)

(73) Assignee: Kulicke and Soffa Hi-Tech Co., Ltd., New Taipei (TW)

( * ) Notice: Subject to any disclaimer, the term of this patent is extended or adjusted under 35 U.S.C. 154(b) by 438 days.

(21) Appl. No.: 17/865,085

(22) Filed: Jul. 14, 2022

(65) Prior Publication Data

US 2023/0356241 A1 Nov. 9, 2023

(30) Foreign Application Priority Data

May 6, 2022 (TW) .................................. 111117065

(51) Int. Cl.
  *B05B 1/32* (2006.01)
  *B05B 1/02* (2006.01)
  (Continued)

(52) U.S. Cl.
  CPC ................ *B05B 1/326* (2013.01); *B05B 1/02* (2013.01); *B05B 13/0278* (2013.01); *B29C 65/522* (2013.01)

(58) Field of Classification Search
  CPC ......... B05B 1/02; B05B 1/083; B05B 1/3046; B05B 1/326; B05B 12/06; B05B 12/08;
  (Continued)

(56) References Cited

U.S. PATENT DOCUMENTS 11,389,821 B2 7/2022 Fliess et al.
2013/0048759 A1* 2/2013 Aguilar ................ B05C 5/0291
239/562
(Continued)

FOREIGN PATENT DOCUMENTS

CN 112387530 2/2021
CN 113165005 7/2021
(Continued)

OTHER PUBLICATIONS

Taiwanese Search Report for Taiwanese patent application No. 111117065 completed Mar. 27, 2023.

*Primary Examiner* — Darren W Gorman
(74) *Attorney, Agent, or Firm* — Christopher M. Spletzer, Sr.

(57) ABSTRACT

A jetting valve with two stage calibrating structures is disclosed, the jetting valve includes: a casing having an accommodating space; a piezoelectric actuating unit disposed on one side of the accommodating space; a spraying unit disposed on the other side of the accommodating space; a displacement amplifying element is arranged at the bottom of the accommodating space and leans against on the spraying unit, the bottom end of the piezoelectric driving unit is in contact with the displacement amplifying element; a sensing unit is arranged on the periphery of the displacement amplifying element to sense the movement of the spraying unit; a control unit, connected to the sensing unit and the piezoelectric actuating unit, adjusting the voltage supplied to the piezoelectric driving unit according to data obtained by the sensing unit; and a liquid supply unit connected to the spraying unit. In accordance with the present invention, a dispenser may be corrected its starting position for dispensing by large-range and small-range cor- (Continued)

rection, and achieve the effect of rapid and accurate spraying calibration.

8 Claims, 3 Drawing Sheets

(51) Int. Cl.
  *B05B 13/02* (2006.01)
  *B29C 65/52* (2006.01)
(58) Field of Classification Search
  CPC .............. B05B 13/0278; B05C 5/0225; B05C 11/1002; B05C 11/10; B05C 11/1013; B29C 65/522
  See application file for complete search history.

(56) References Cited

U.S. PATENT DOCUMENTS

| | | | | |
|---|---|---|---|---|
| 2014/0124600 | A1* | 5/2014 | Ciardella | B41J 2/04 239/569 |
| 2016/0136661 | A1* | 5/2016 | Hong | B05C 5/0225 239/1 |
| 2016/0339467 | A1* | 11/2016 | Conner | H10N 30/802 |
| 2016/0339470 | A1* | 11/2016 | MacIndoe | B05C 5/0225 |
| 2016/0339471 | A1* | 11/2016 | Bittner | B05C 5/0225 |
| 2018/0221910 | A1* | 8/2018 | Burzo | B05C 11/1034 |
| 2019/0047015 | A1* | 2/2019 | Fukada | B05C 5/0291 |
| 2019/0337008 | A1* | 11/2019 | Gould | B05C 21/00 |
| 2020/0038902 | A1* | 2/2020 | Bergstrom | H05K 13/0469 |
| 2021/0018353 | A1* | 1/2021 | Fliess | G01F 11/44 |
| 2021/0154688 | A1* | 5/2021 | Qu | F16K 1/00 |
| 2021/0245188 | A1* | 8/2021 | Felber | B05B 1/3046 |
| 2021/0354168 | A1* | 11/2021 | Fliess | B05C 11/1034 |
| 2022/0040725 | A1* | 2/2022 | Fliess | B05C 5/001 |
| 2022/0072580 | A1* | 3/2022 | Groene | B05B 1/083 |
| 2022/0250099 | A1* | 8/2022 | Bliss | B05C 5/0225 |
| 2022/0280967 | A1 | 9/2022 | Fliess et al. | |
| 2022/0314267 | A1* | 10/2022 | Bliss | B05C 5/0225 |

FOREIGN PATENT DOCUMENTS

| | | |
|---|---|---|
| CN | 114173940 | 3/2022 |
| TW | M633974 | 11/2022 |
| WO | 2019197181 | 10/2019 |

\* cited by examiner

JETTING VALVE WITH TWO STAGE CALIBRATING STRUCTURES

CROSS REFERENCE TO RELATED APPLICATION

This application claims priority to Taiwan Patent Application Serial No. 111117065, filed on May 6, 2022, the entire contents of the above-identified application are hereby incorporated by reference.

BACKGROUND OF THE INVENTION

1. Field of the Invention

The present application generally relates to a fluid material dispenser for calibration, and more particularly to a piezoelectric jetting valve with calibrating structures which is applied in dispensing equipment.

2. Description of the Prior Art

In currently industrial applications, advanced piezoelectric jetting valve has gradually replaced conventional pneumatic mechanical dispensing valve and becomes a major equipment in the dispensing device. The conventional pneumatic mechanical dispensing valve uses air pressure and the rebound force of a spring to squeeze the fluid material out of a syringe, valve body or the like, because the jetting amount of fluid material is not precise as predicted during dispensing process, in addition, the variation of air pressure and elastic fatigue of spring will also affect the accuracy of dispense, so that the pneumatic mechanical dispensing valve is quite hard to set calibrating parameters according to the character of fluid material.

For the purpose of solving the disadvantages of the pneumatic mechanical dispensing valve stated above, piezoelectric jetting valve thus was developed. The piezoelectric jetting valve compares with the pneumatic mechanical dispensing valve, providing stable operation and duration, a better speed of processing, even in a long-term high-speed operation, it can still remain stable performances.

The actuating principle of the piezoelectric jetting valve is to apply voltage to a piezoelectric element of the piezoelectric jetting valve, cause the piezoelectric element to move a linkage up and down. One end of the linkage is connected to a nozzle, when a voltage is applied to the piezoelectric element, the linkage is being lifted, the fluid material flows toward through the nozzle, and then the linkage actuates downward, so that the fluid material dispenses onto a substrate or a wafer.

In general, although piezoelectric material has the characteristics of fast response and high frequency, however, the piezoelectric element of a piezoelectric jetting valve can just move a small scale of displacement, so it is necessary to arrange a displacement amplifying element to magnify the displacement generated by the piezoelectric element. Moreover, generally the piezoelectric jetting valve comprises casing, needle, nozzle and fluid supply unit, and due to installation deviation caused from assembling needle, nozzle and material supply unit, the currently piezoelectric jetting valve is not capable of providing a wide range calibration of displacement.

Furthermore, because the material expansion coefficient of a high and low temperature manufactured material affects the stroke of a piezoelectric element amplification mechanism, therefore, the piezoelectric element can only provide a small range of calibration for actuation mechanism.

As mentioned above, in view of the shortcomings of the conventional technology that cannot provide large range movements for calibration, and in order to achieve the object for speedy dispensing with accuracy. Based on years of experience in the related industry, the inventors have conducted extensive researches and experiments, and successfully developed the jetting valve with two stage calibrating structure of this invention.

With respect to the jetting frequency for continued jetting of a fluid material of the present invention may greater than 500 Hz, and the time resolution may reach to 1 μs. Furthermore, the present invention may also attach with a variety of modularized nozzle to achieve easy replacement and maintenance, and accurately adjust jetting amount of a material, width and size of the droplets according to the characteristics of the material during a dispensing process.

SUMMARY OF THE INVENTION

The present invention discloses a jetting valve with two stage calibrating structure, which comprises a casing, having an accommodating space and forming an upper opening and a bottom opening; a piezoelectric actuating unit includes an actuator, the actuator is disposed within the accommodating space in a direction along an axis of the upper opening, so that the actuator can move up and down in the accommodating space; a spraying unit is connected to the bottom opening on a bottom side of the casing; a displacement amplifying element is arranged at the bottom of the accommodating space, one side of the displacement amplifying leans against the spraying unit, opposite side of the displacement amplifying element is contacted with the bottom end of the actuator; a sensing unit is arranged at the periphery of the displacement amplifying element to sense the movement of the spraying unit; a control unit is electrically connected to the sensing unit and the piezoelectric actuating unit; and a fluid material supply unit with a screw nut is coupled to the spraying unit.

In an embodiment of the present invention, the sensing unit is arranged at the periphery of the displacement amplifying element to sense the movement of a thimble of the spraying unit. The control unit is configured to adjust the voltage applied to the piezoelectric actuating unit according to the data sensed by the sensing unit.

In addition, the fluid material supply unit has an assembly hole and a screw nut, and is fastened with the spraying unit by penetrating through the assembly hole with the screw nut.

The sensing unit, depends on the implementations, may be an optical sensor, a capacitance sensor, an optical scale sensor or the like.

The control unit executes voltage operation to control the piezoelectric element accurately, that is, in accordance with setting parameters to change open and close speed of a nozzle or a valve.

BRIEF DESCRIPTION OF THE DRAWINGS

For a better understanding of the aforementioned summary of the invention as well as the following embodiments thereof, reference should be made to the Description of Embodiments below, in conjunction with the appended drawings in which like reference numerals refer to corresponding parts throughout the figures.

DETAILED DESCRIPTION OF THE PREFERRED EMBODIMENT

Figure 1:
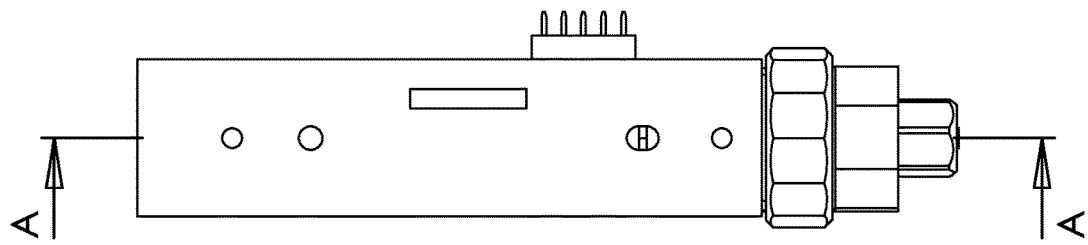
FIG. 1 is an outlook view and a cross-sectional view of the invention.
Figure 1:
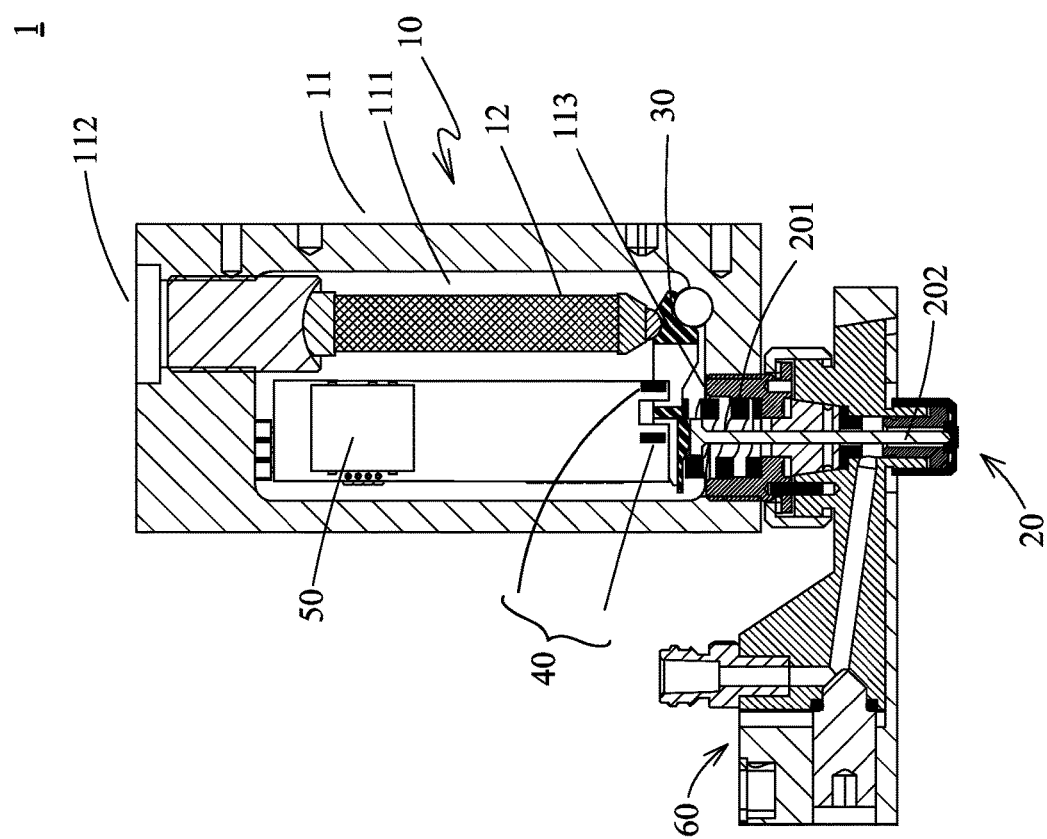

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1, a jetting valve structure in accordance with an exemplary embodiment of the invention comprises a casing 11 which has an accommodating space 111; a piezoelectric actuating unit 10 includes an actuator 12; a spraying unit 20 connected to the casing 11; a displacement amplifying element 30 arranged at the bottom of the accommodating space 111; a sensing unit 40, disposed at a protrusion 303 on a top surface of the displacement amplifying element 30 to sense movement of the displacement amplifying element 30; a control unit 50 for adjusting voltage applied to the piezoelectric actuating unit 10, and a fluid material supply unit 60.

The casing 11 having an upper opening 112 and a bottom opening 113 respectively, and the actuator 12 disposed within the accommodating space 111 along an axis of the upper opening 112, so that the actuator 12 can move up and down through the accommodating space 111. The spraying unit 20 is connected to the bottom opening 113 on a bottom side of the casing 11.

A round recess 302 formed at top surface of the displacement amplifying element 30 is contacted with a bottom end of the actuator 12, and a convex surface 301 formed at bottom surface of the opposite side of the displacement amplifying element 30 is cling to top surface of a thimble 202, thus the displacement amplifying element 30 may multiply amplify the minor movement of the actuator 12 according to the Principle of Lever.

The sensing unit 40 is arranged on the periphery of the displacement amplifying element 30 to sense the movement of the thimble 202. The control unit 50 is connected to the sensing unit 40 and the piezoelectric actuating unit 10, according to the movement sensed by the sensing unit 40 so as to adjust the voltage applied to the actuator 12. The fluid material supply unit 60 has an assembly hole 601 and a screw nut 602, and is screwed together with the spraying unit 20 by penetrating through the assembly hole 601 with the screw nut 602.

Figure 2:
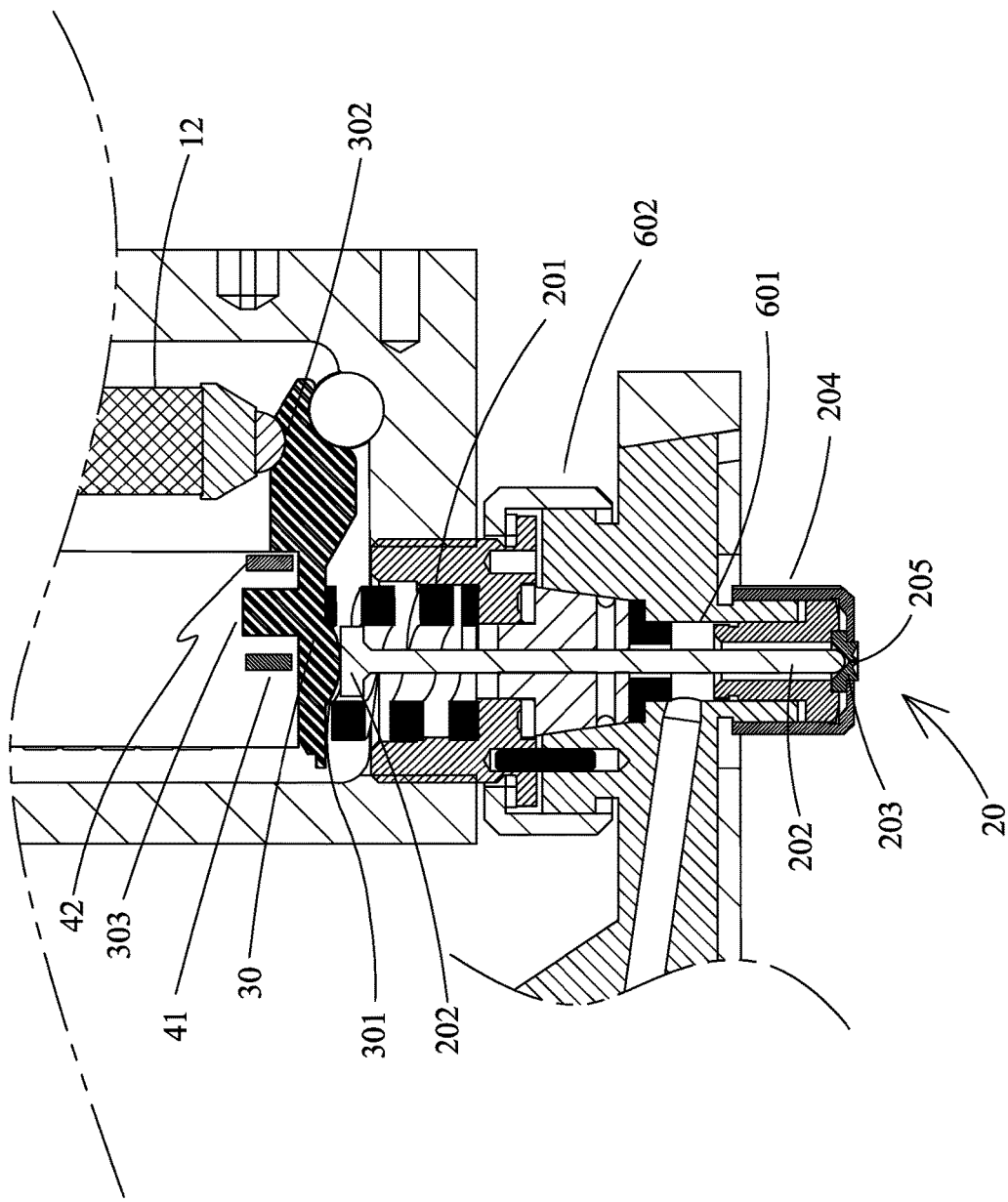
FIG. 2 is a partial enlarged view of the cross-sectional part in FIG. 1.

FIG. 2 is a partial enlarged view of the cross-sectional part of the spraying unit 20, as shown in FIG. 2, the spraying unit 20 includes a spring 201, a thimble 202, a nozzle 203, and an adjusting nut 204. The top surface of the thimble 202 is contacted to the convex surface 301 at one side of the displacement amplifying element 30 by an elastic force of the spring 201.

The nozzle 203 having a glue outlet 205 for fluid material to be dispensed therefrom, and the adjusting nut 204 is configured to move the spraying unit 20 in a large range to a starting position of the nozzle 203 for jetting.

Figure 3:
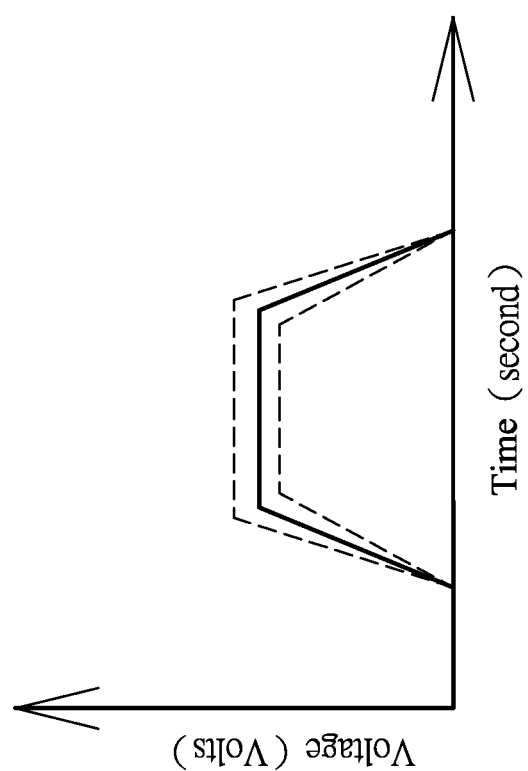
FIG. 3 is a schematic calibrating diagram for piezoelectric voltage and corresponding time.

Referring to FIG. 3, furthermore, illustrates a schematic calibrating diagram for piezoelectric voltage and corresponding time, the solid line as shown represents the status for voltage applied originally, the dotted line indicates the state of a correction voltage. When voltage is applied to the actuator 12, it stretches downward with a tiny movement, and then the tiny movement magnified by the displacement amplifying element 30.

The sensing unit 40 is configured to sense the movement of the thimble 202, in accordance with increase or decrease of the voltage applied to the piezoelectric actuating unit 10 to adjust the movement of the thimble 202. As shown in FIG. 3, the upper dotted line indicates the applied voltage is increased, and causes the actuator 12 to stretch, conversely, the bottom dotted line indicates the applied voltage is decreased, that causes the actuator 12 to contract.

Depending upon variety of applications, appropriate kind of sensors may be adopted for the sensing unit 40. In one practical implementation, referring again to FIG. 1, a set of optical sensors is applied, the optical sensors are disposed in the accommodating space 111, and set above the displacement amplifying element 30. The sensing unit 40 includes a set of a light emitting unit 41 and a light received unit 42 for sensing the movement of the thimble 202 at one side of the displacement amplifying element 30.

In general, low viscous material may generate diffusion and sputter, in order to prevent those problems, decreasing the applied voltage so that the jetting force can be restrained to avoid the foregoing phenomenon. On the contrary, when using high viscous material, it is necessary to increase the jetting force for spraying the material out of the nozzle.

In one embodiment, the adjusting nut 204 is a detachable module.

In one embodiment, the sensing unit 40 may also correct such as, velocity, or other adjustable parameters.

The control unit 50, according to the sensed movement of the thimble 202 at one side of the displacement amplifying element 30, is configured to adjust the voltage applied to the piezoelectric actuating unit 10, such that during a dispensing process, the control unit 50 cyclically adjusts and compensates the jetting amount of material, so as to maintain the size of the droplets uniform. For example, the control unit 50 adjusting open and close speed of the glue outlet 205 to achieve an optimal dispensing status for fluid material.

In one embodiment, before a dispensing process, the machine operator automatically or manually adjusts the adjusting nut 204 to move in a large calibrating range to calibrate the starting position of the nozzle 203 for jetting.

In another embodiment, the piezoelectric actuating unit 10 is moved automatically or manually by the machine operator to calibrate the starting position of the nozzle 203 for jetting.

Because of the tolerance for assembly of a dispenser is up to 20%, a first stage calibration, the large range static calibration described above is recommended before a dispensing process. And then, when a dispensing process starts, a second stage is conducted for minor and precise correction by using the displacement amplifying element 30 and the sensing unit 40 according to the present invention.

Furthermore, in other embodiments of the present invention may also attach with a variety of modularized nozzle to achieve easy replacement and maintenance, and accurately adjust jetting amount of fluid material, width and size of the droplets according to the characteristics of the fluid material during a dispensing process.

The above embodiment is related to the detailed technical contents and inventive features thereof. Those skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A jetting valve with two stage calibrating structures, comprising:
    a casing having an accommodating space, and forming an upper opening and a bottom opening;
    a piezoelectric actuating unit including an actuator, wherein the actuator is disposed within the accommodating space along an axis of the upper opening, so that the actuator can move up and down in the accommodating space;
    a spraying unit connected with the bottom opening on a bottom side of the casing;
    a displacement amplifier configured to magnify movement of the actuator, wherein the displacement amplifier is arranged at a bottom of the accommodating space, one side of the displacement amplifier leans against the spraying unit, the displacement amplifier contacted with a bottom end of the actuator;
    a sensing unit including a light emitter and a light receiver configured to sense a movement of the spraying unit, wherein the sensing unit is arranged within the accommodating space and on a periphery of the displacement amplifier;
    a controller, connected to the sensing unit and the piezoelectric actuating unit, adjusting the voltage applied to the piezoelectric actuating unit according to data obtained by the sensing unit; and
    a fluid material supply unit having a screw nut and connected to the spraying unit.

2. The jetting valve with two stage calibrating structures as claimed in claim 1, wherein the spraying unit comprising:
    a spring;
    a thimble including a top surface, the top surface of the thimble is contacted to a convex surface at one side of the displacement amplifier by an elastic force of the spring;
    a nozzle, having a glue outlet for dispensing a fluid material, and
    an adjusting nut for adjusting the spraying unit to a starting position of the nozzle for jetting.

3. The jetting valve with two stage calibrating structures as claimed in claim 2, wherein the adjusting nut is a detachable module.

4. The jetting valve with two stage calibrating structures as claimed in claim 3, wherein the adjusting nut is configured to be adjusted automatically or manually to correct the starting position of the nozzle for jetting.

5. The jetting valve with two stage calibrating structures as claimed in claim 3, wherein the piezoelectric actuating unit is configured to be adjusted automatically or manually to correct the starting position of the nozzle for jetting.

6. The jetting valve with two stage calibrating structures as claimed in claim 2, wherein the controller is configured to adjust an open and close speed of the glue outlet to achieve an optimal dispensing status for fluid material.

7. The jetting valve with two stage calibrating structures as claimed in claim 1, wherein the data sensed by the sensing unit includes a velocity or a displacement of the nozzle.

8. The jetting valve with two stage calibrating structures as claimed in claim 2, wherein the nozzle is provided with modularization.

* * * * *